US010666369B2

(12) United States Patent
Halozan et al.

(10) Patent No.: US 10,666,369 B2
(45) Date of Patent: May 26, 2020

(54) ADAPTIVE PROCESSING IN TIME-MULTIPLEXED SIGNALS

(71) Applicant: GATESAIR, INC., Mason, OH (US)

(72) Inventors: Scott Halozan, Mason, OH (US); Ted Korte, Mason, OH (US)

(73) Assignee: GATESAIR, INC., Mason, OH (US)

( * ) Notice: Subject to any disclaimer, the term of this patent is extended or adjusted under 35 U.S.C. 154(b) by 0 days.

(21) Appl. No.: 16/090,018

(22) PCT Filed: Mar. 29, 2017

(86) PCT No.: PCT/US2017/024732
§ 371 (c)(1),
(2) Date: Sep. 28, 2018

(87) PCT Pub. No.: WO2017/172903
PCT Pub. Date: Oct. 5, 2017

(65) Prior Publication Data
US 2019/0140755 A1    May 9, 2019

Related U.S. Application Data

(60) Provisional application No. 62/314,643, filed on Mar. 29, 2016.

(51) Int. Cl.
*H04H 20/67* (2008.01)
*H04H 20/42* (2008.01)
(Continued)

(52) U.S. Cl.
CPC ............ *H04H 20/67* (2013.01); *H04H 20/30* (2013.01); *H04H 20/33* (2013.01); *H04H 20/42* (2013.01)

(58) Field of Classification Search
CPC .............................. H04H 20/30; H04H 20/67
See application file for complete search history.

(56) References Cited

U.S. PATENT DOCUMENTS 5,249,085 A * 9/1993 Deveau ................. G11B 20/06
                                                        327/141
6,519,262 B1    2/2003 Stephens et al.
(Continued)

FOREIGN PATENT DOCUMENTS

| EP | 1041758 A2 | 10/2000 |
| WO | 2003/085860 A1 | 10/2003 |
| WO | 2005/022797 A2 | 3/2005 |

OTHER PUBLICATIONS

Applicant: GatesAir, Inc.; International Search Report, Authorized Officer: Seoung Young Lee; Date of Completion: Jul. 10, 2017; 3 pgs.

(Continued)

*Primary Examiner* — Hsinchun Liao
(74) *Attorney, Agent, or Firm* — Tarolli, Sundheim, Covell & Tummino LLP

(57) ABSTRACT

Systems and methods are provided for broadcasting a signal. A multiplexer combines a first signal from a first signal source and a second signal from a second signal source as a time divisional multiplexed signal and provides a timing signal, distinct from the time division multiplexed signal, that indicates, for a given time, from which of the first and the second signal source a corresponding portion of the time divisional multiplexed signal originated. A signal conditioning component receives each of the time divisional multiplexed signal and the timing signal and alters the time division multiplexed signal in a manner that prepares the signal for broadcast. The signal conditioning component dynamically alters its behavior according to the timing signal. An antenna transmits the time division multiplexed signal.

18 Claims, 4 Drawing Sheets

(51) Int. Cl.
*H04H 20/30* (2008.01)
*H04H 20/33* (2008.01)

(56) References Cited

U.S. PATENT DOCUMENTS

| | | | |
|---|---|---|---|
| 6,975,600 B1 | 12/2005 | Vaughan et al. | |
| 2002/0141478 A1* | 10/2002 | Ozluturk | G06F 13/374 375/130 |
| 2005/0238057 A1* | 10/2005 | Toma | H04N 21/2368 370/503 |
| 2010/0135217 A1 | 6/2010 | Laiho et al. | |
| 2015/0341586 A1 | 11/2015 | Allison, III et al. | |
| 2016/0080778 A1 | 3/2016 | Ilsen et al. | |

OTHER PUBLICATIONS

Applicant: GatesAir, Inc.; European Patent Application No. 17776541.9; Supplemental European Search Report, Officer: C. Torcal Serrano; Date of Completion: Oct. 18, 2019; 5 pgs.

Applicant: GatesAir, Inc.; European Patent Application No. 17776546.8; Supplemental European Search Report, Officer: C. Torcal Serrano; Date of Completion: Oct. 19, 2019; 5 pgs.

Applicant: GatesAir, Inc.; Korean Patent Application No. 10-2018-7031174; Office Action from the Korean Intellectual Property Office; dated: Mar. 3, 2020; 9 pgs.

Jonathan Rodriguez, "Fundamentals of 5G Mobile Networks", pp. 201-202, Wiley, 2015.

Applicant: GatesAir, Inc.; Korean Patent Application No. 10-2018-7031188; Office Action from the Korean Intellectual Property Office; dated: Mar. 3, 2020; 11 pgs.

Rohde & Schwarz, Article: "T2-MI: Technical overview", Rohde & Schwarz GmbH & Co. KG, 2015.

Martyn Horspool, Article: "DVB-T2 technology and New Products", Gatesair, Jul. 2014 (Jul. 2014).

\* cited by examiner

ADAPTIVE PROCESSING IN TIME-MULTIPLEXED SIGNALS

This application is a 371 of PCT/US2017/24732, filed Mar. 29, 2017 and entitled ADAPTIVE PROCESSING IN TIME-MULTIPLEXED SIGNALS, which claims priority to U.S. Provisional Application No. 61/314,643, filed Mar. 29, 2016 and entitled TIME-MULTIPLEXED SPECTRUM SHARING. Each of the above-identified applications is incorporated herein by reference in their entirety.

RELATED APPLICATIONS

This application claims priority to U.S. Provisional Patent Application Ser. No. 62/314,643, filed Mar. 29, 2016. The entirety of this application is hereby incorporated by reference.

TECHNICAL FIELD

The present invention relates to RF communication systems and is particularly directed to systems and methods for adaptive processing in time-multiplexed signals.

BACKGROUND

Time division multiplexing (TDM) is a method of transmitting and receiving independent signals over a common signal path by means of synchronized switches at each end of the transmission line so that each signal appears on the line only a fraction of time in an alternating pattern. The time domain is divided into several recurrent time slots of fixed length, one for each subchannel. A sample byte or data block of first subchannel is transmitted during a first time slot, a second subchannel is transmitted during a second time slot, and so forth.

SUMMARY OF THE INVENTION

In accordance with an aspect of the present invention, a broadcasting system is provided. A multiplexer combines a first signal from a first signal source and a second signal from a second signal source as a time divisional multiplexed signal and provides a timing signal, distinct from the time division multiplexed signal, that indicates, for a given time, from which of the first and the second signal source a corresponding portion of the time divisional multiplexed signal originated. A signal conditioning component receives each of the time divisional multiplexed signal and the timing signal and alters the time division multiplexed signal in a manner that prepares the signal for broadcast. The signal conditioning component dynamically alters its behavior according to the timing signal. An antenna transmits the time division multiplexed signal.

In accordance with another aspect of the present invention, a method is provided for broadcasting a signal. A first signal, from a first signal source, and a second signal, from a second signal source, are combined as a time divisional multiplexed signal at a multiplexer. The time division multiplexed signal is sampled at a digital predistortion adaptation engine. A timing signal, distinct from the time division multiplexed signal, is provided to the digital predistortion adaptation engine that indicates, for a given time, from which of the first and the second signal source a corresponding portion of the time divisional multiplexed signal originated.

At the digital predistortion adaptation engine, a first set of filter coefficients is determined from the samples taken at times when the timing signal indicates that the corresponding portion of the time division multiplexed signal originated with the first signal source. A second set of filter coefficients are determined from the samples taken at times when the timing signal indicates that the corresponding portion of the time division multiplexed signal originated with the second signal source. The second set of filter coefficients is different than the first set of filter coefficients. Digital predistortion is applied to the time division multiplexed signal, such that the first set of filter coefficients is applied to the time division multiplexed signal at times when the timing signal indicates that the corresponding portion of the time division multiplexed signal originated with the first signal source and the second set of filter coefficients is applied to the time division multiplexed signal at times when the timing signal indicates that the corresponding portion of the time division multiplexed signal originated with the second signal source. The time division multiplexed signal is transmitted at an associated transmitter.

In accordance with yet another aspect of the present invention, a first signal, from a first signal source, and a second signal, from a second signal source, are combined as a time divisional multiplexed signal at a multiplexer. A timing signal, distinct from the time division multiplexed signal, is provided to the transmitter automatic level control that indicates, for a given time, from which of the first and the second signal source a corresponding portion of the time divisional multiplexed signal originated. A first signal parameter for the time division multiplexed signal is maintained while the timing signal indicates that the corresponding portion of the time division multiplexed signal originated with the first source. A second signal parameter for the time division multiplexed signal is maintained while the timing signal indicates that the corresponding portion of the time division multiplexed signal originated with the second source. The second signal parameter is from the first signal parameter. The time division multiplexed signal is broadcast at an associated antenna.

DETAILED DESCRIPTION

Figure 1:
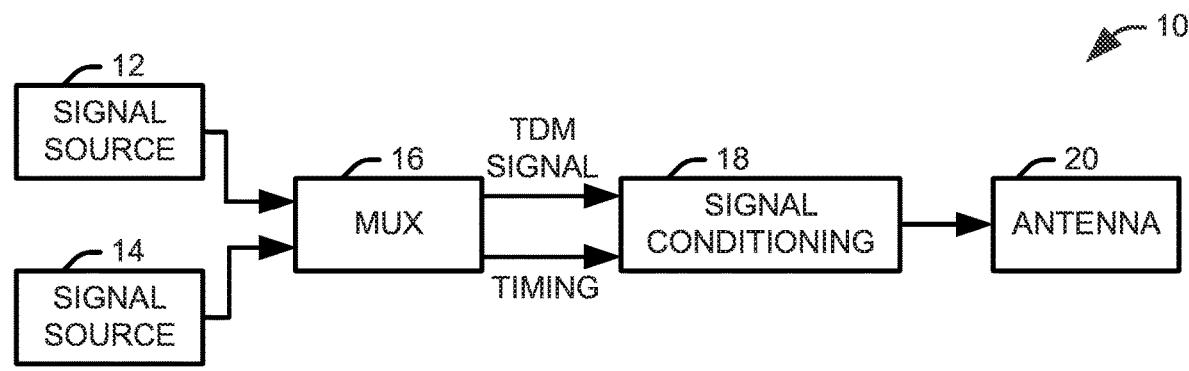
FIG. 1 illustrates a system for generating a time division multiplexed signal in accordance with an aspect of the present invention.

FIG. 1 illustrates a system 10 for generating a time division multiplexed signal in accordance with an aspect of the present invention. The system 10 includes a first signal source 12 and a second signal source 14 provided to a multiplexer assembly 16. Depending on the implementation, the first and second signal sources 12 and 14 can represent any signal sources that produce signals having significantly different signal characteristics, such as different modulation error ratios, average output power levels, signal-to-noise ratios, and peak-to-average power ratio (PAPR). Accordingly, the first and second signal sources 12 and 14 can represent separate assemblies, independent modulators operating within a common assembly, or a same signal-generating subsystem operating in two distinct modes, such as a single modulating unit dynamically switching between two distinct modulation schemes. The multiplexer assembly 16 combines the data from the first signal source 12 and the second signal source 14 into a time division multiplexed signal. It will be appreciated that, in accordance with an aspect of the invention, the first signal source 12 and the second signal source 14 provide signals.

The multiplexed signal is provided to a signal conditioning element 18. The signal conditioning element 18 is a hardware element, for example, implemented as a field programmable gate array, an integrated circuit, or a general purpose processor operatively connected to a non-transitory computer readable medium storing software instructions, that alters the time division multiplexed signal in a manner that prepares the signal for broadcast at an associated antenna 20. It will be appreciated that the signal conditioning element can be part of the exciter or the transmitter, depending on the desired function of the system and can represent multiple components of the system 10 controlled via a timing signal as described below. Examples of signal conditioning elements 18 can include a power amplifier or an automatic level control associated with the amplifier, an update engine for an adaptive digital predistortion system that predistorts a signal to account for signal distortion at a power amplifier or other downstream component or an adaptive power control system.

In accordance with an aspect of the present invention, the multiplexer assembly 16 also provides a timing signal to the signal conditioning component 18, such that the signal conditioning component can dynamically alter its behavior according to the source associated with the time-multiplexed signal. It will be appreciated that the timing signal is distinct from the time division multiplexed signal, such that it is not extracted from the signal itself, but is provided separately. In one example where the function of the signal conditioning element depends on feedback, samples taken during periods when the signal originated with the first source 12 can be stored and analyzed separately from samples taken when the signal originated with the second source 14. Similarly, where the signal conditioning component 18 is a power control system, the system could use separate parameters for each signal source, such as average power level, peak-to-average ratio, and signal quality. Where the signal conditioning component is a digital predistortion system, the system could generate and apply different filter coefficients for each signal source from samples taken during the time slot associated with each signal. Where the signal conditioning component 18 is a power amplifier or an automatic level control associated with the amplifier, the amplifier could be muted for one signal source to conserve power when that portion of the signal is not required.

In one implementation, the first data source 12 provides video formatted according to a broadcasting standard utilizing future extension frames, such as the Digital Video Broadcasting, Second Generation Terrestrial (DVB-T2) standard. This standard includes future extension frames, during which the DVB-T2 formatted video data is not transmitted, such that the signal is mute or transmitting data from a second source during this time. In one implementation, the second data source 14 can provide data modulated according to the Long Term Evolution (LTE) standard and formatted for reception for a mobile device. It will be appreciated that the second data source 14 can be an intermediary source of the data, for example, as one cell within in a network of towers broadcasting mobile signals.

Figure 2:
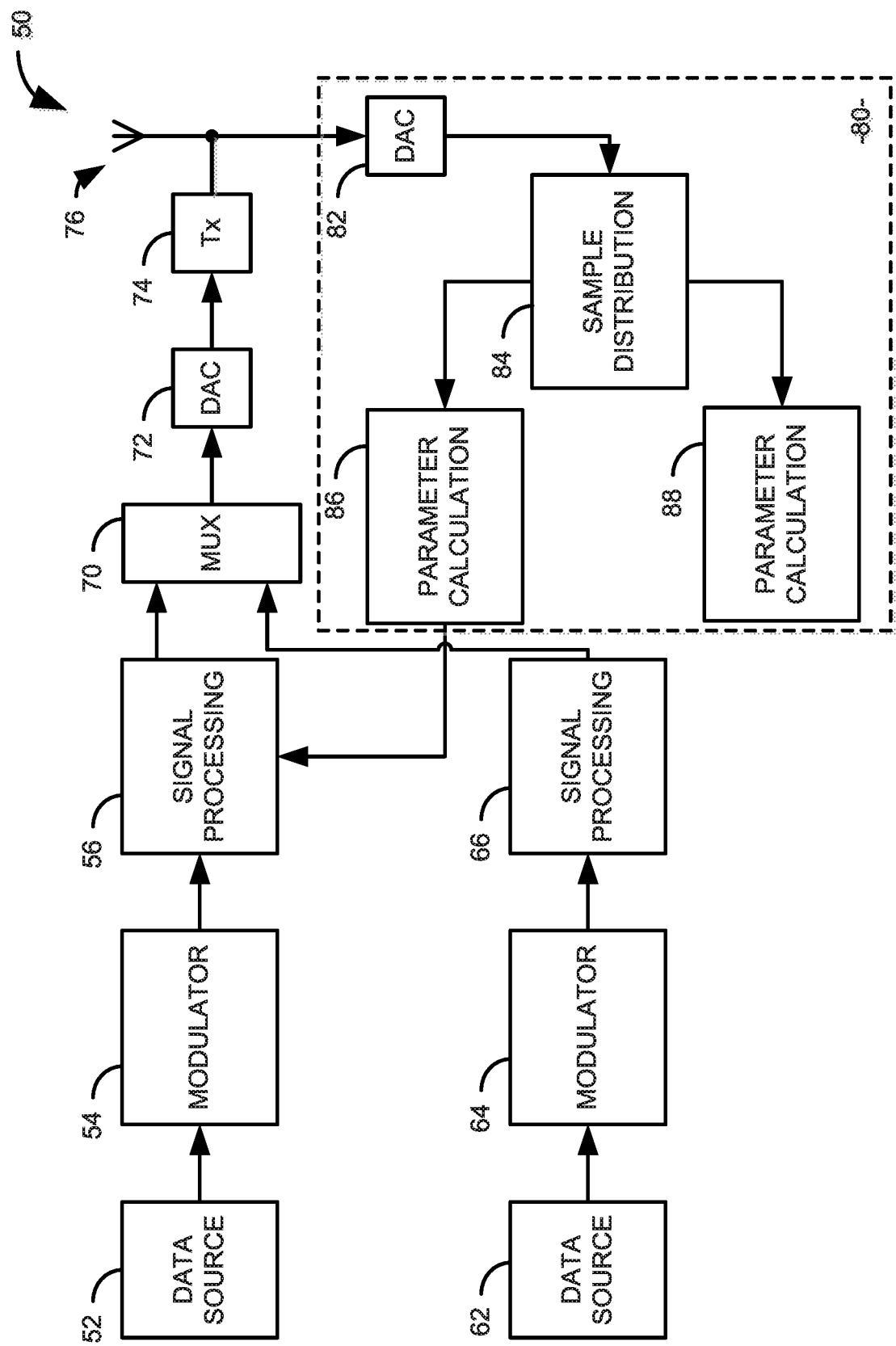
FIG. 2 illustrates one example of a system for generating a time division multiplexed signal in accordance with an aspect of the present invention.

FIG. 2 illustrates one example of a system 50 for generating a time division multiplexed signal in accordance with an aspect of the present invention. Data from a first data source 52 is provided to a first modulation component 54 configured to modulate the data onto a carrier for transmission. In the illustrated implementation, the data is modulated according to the DVB-T2 standard. The modulated signal can then be provided to a first signal processing component 56, configured to prepare the signal for transmission, including providing predistortion to the signal to account for distortion induced within the transmission path. The first signal processing component 56 can also provide noise reduction to the signal as well as upconverting the signal to a first radio frequency (RF) signal at an appropriate frequency for transmission.

A second data source 62 provides a second stream of data for transmission via FEF slots. In the illustrated implementation, the second data source 62 carries data formatted for reception for a mobile device associated with a first mobile network. It will be appreciated that the second data source 62 can be an intermediary source of the data, for example, as one cell within in a network of towers broadcasting mobile signals. Data from the second data source 62 is provided to a second modulation component 64 configured to modulate the data onto a carrier for transmission. In the illustrated implementation, the carrier is an intermediate frequency signal, and the data is modulated according to the Long Term Evolution (LTE) standard. The modulated signal can then be provided to a second signal processing component 66, configured to prepare the signal for transmission, including providing predistortion to the signal to account for distortion induced within the transmission path. The second signal processing component 66 can also provide noise reduction to the signal as well as upconverting the signal to a second RF signal at an appropriate frequency for transmission.

A multiplexer 70 combines the first RF signal and a second RF signal into a time division multiplexed signal. In this arrangement, the first RF signal occupies a first set of a plurality of time slots comprising the time multiplexed signal, and the second RF signal occupies a second set of the plurality of time slots. In one implementation, the second signal is inserted into a future extension frame associated with the first signal, such that the second set of time slots are completely within future extension frames for a broadcast standard associated with the first RF signal. The time-multiplexed signal is then provided to a digital-to-analog converter (DAC) 72 that transforms the time-multiplexed signal into an analog signal for broadcast at by an associated transmitter 74 at an antenna 76.

In accordance with an aspect of the present invention, a digital predistortion update engine 80 of the system is adapted to provide separate digital feedback parameters for the two signals. The digital predistortion update engine 80 samples the signal just before transmission to provide a feedback signal. An analog-to-digital converter (ADC) 82 converts the feedback signal into a digital signal. The resulting digital signal is provided to a sample distribution component 84 that demultiplexes the digital signal to split the feedback signal into a first stream of samples, representing portions of the time division multiplexed signal that originated from the first video source 52, and a second stream of samples, representing portions of the time division multiplexed signal that originated from the second video source 62. To facilitate demultiplexing of the feedback signal, a timing signal can be provided from the multiplexer 70 to the sample distribution component 86, such that, with a known delay for the feedback path, the sample distribution component 86 can distinguish between the two data sources 52 and 62 from a time at which each sample is received.

The first stream of input samples is provided to a first digital predistortion update component 88 and the second stream of input samples is provided to a second digital predistortion update component 89. Each of the predistortion update components 88 and 89 is configured to analyze its respective stream of samples to determine appropriate predistortion parameters for the signal. For example, a digital signal corresponding to the sampled signal can be stored locally and compared to the feedback samples to determine a transfer function of the transmitter 74 on the signal. An inverse function can then be determined by each predistortion update component 88 and 89 and provided to its corresponding signal processing component 56 and 66 for application to the signal.

In one implementation, the signal processing components 56 and 66 can be implemented as a common predistortion processing circuit in the signal path, between the modulators 54 and 64 and the DAC 72. This circuit can be modified to hold different filtering coefficients for the signals from the two data sources 52 and 62 based on the timing with which they are multiplexed at the modulator 70. The circuit can receive timing information from the timing signal to determine when the signals from the different signal sources are active so it can apply the correct coefficients. In this implementation, a common digital predistortion update engine adaption update engine can be used in place of the predistortion update components 88 and 89 to process the feedback samples from the transmitter output, with the engine modified to keep a separate adaptation result for each data source.

Figure 3:
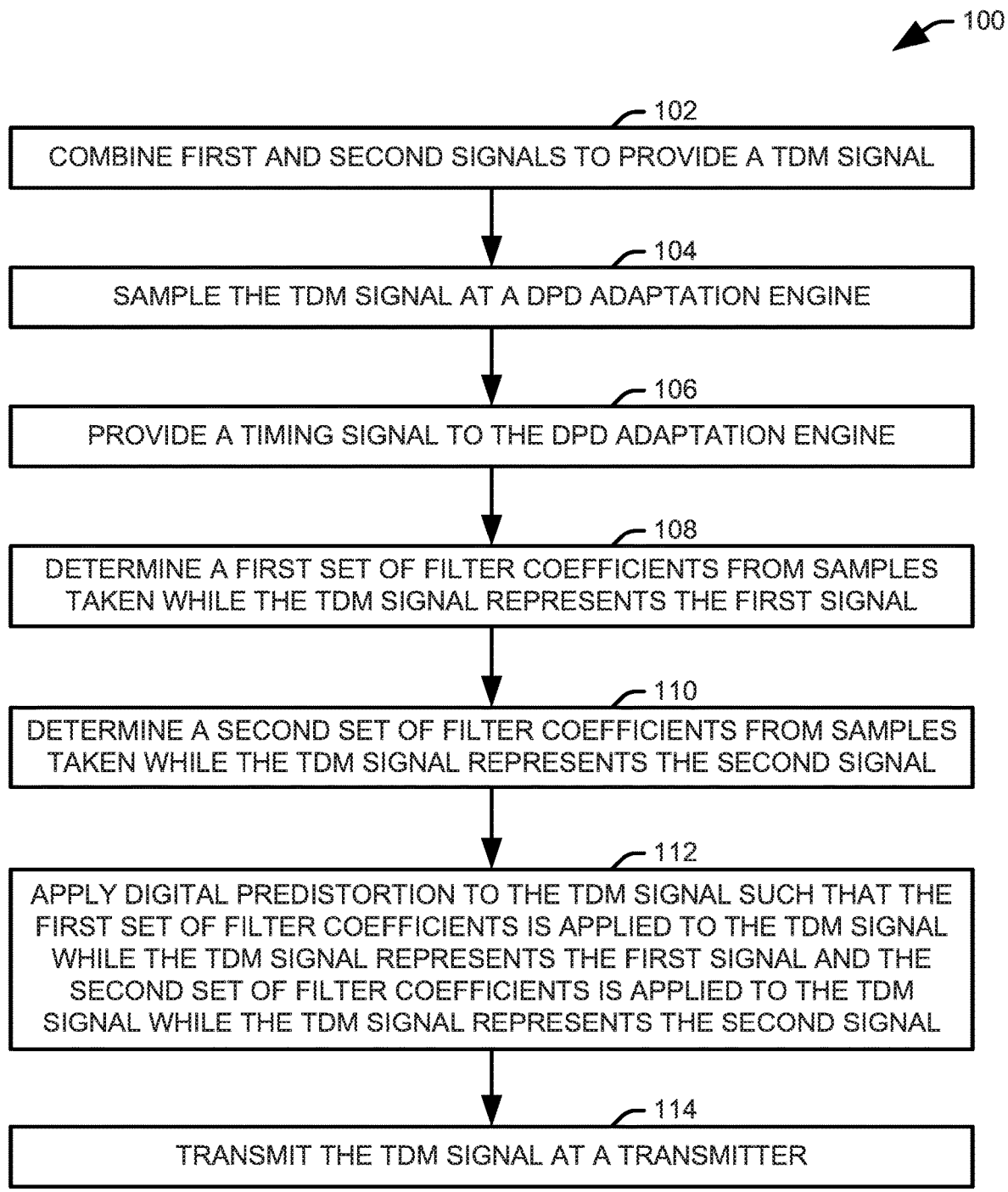
FIG. 3 illustrates one example of a method for broadcasting a signal.
Figure 4:
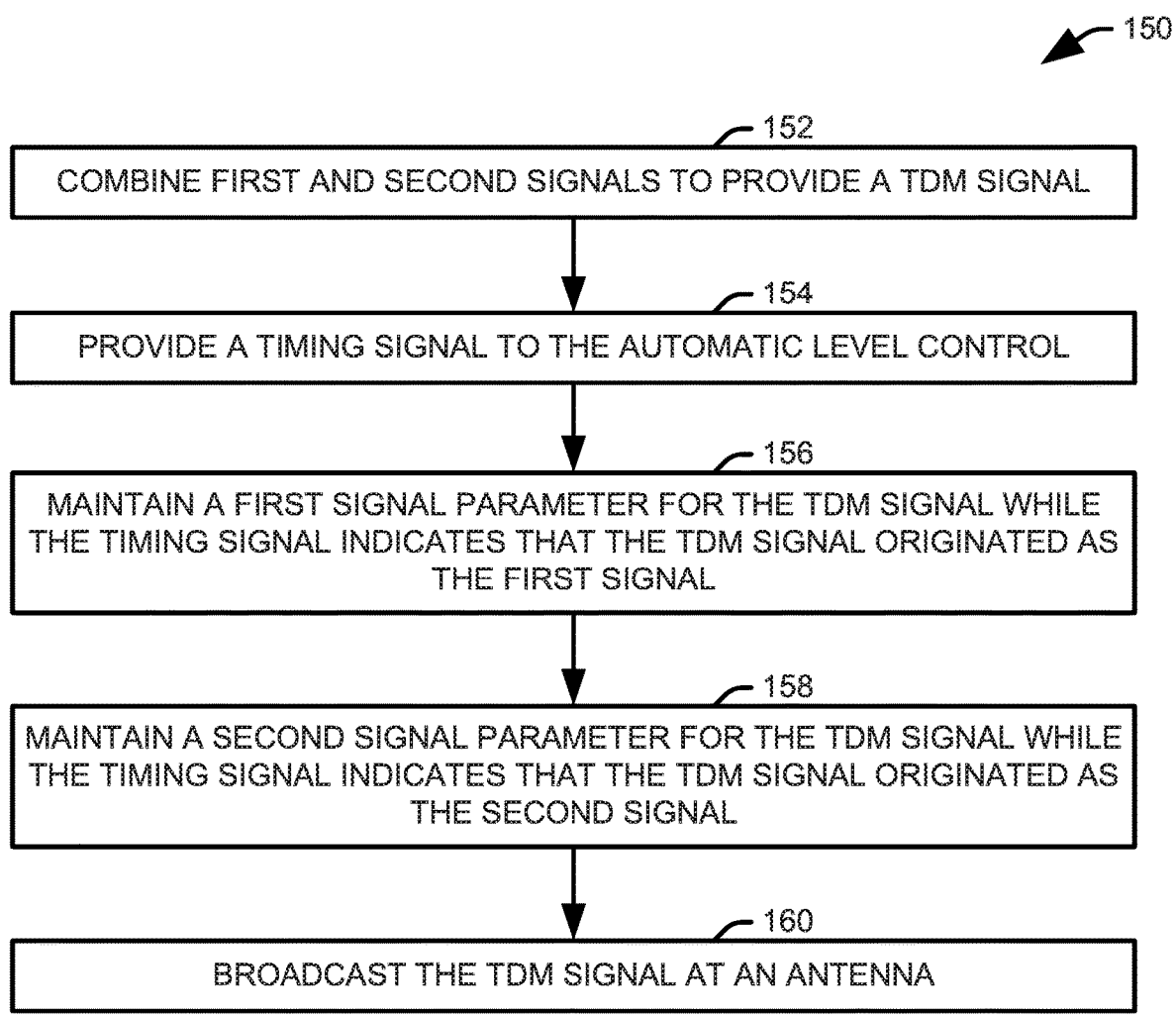
FIG. 4 illustrates another example of a method for broadcasting a signal.

In view of the foregoing structural and functional features described above in FIGS. 1 and 2, example methods will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some actions could in other examples occur in different orders and/or concurrently from that shown and described herein.

FIG. 3 illustrates one example of a method 100 for broadcasting a signal. At 102, a first signal, from a first signal source, and a second signal, from a second signal source, are combined as a time divisional multiplexed (TDM) signal at a multiplexer. It will be appreciated that the first and second signal sources can represent any signal sources that produce signals having significantly different signal characteristics, and can include separate assemblies, independent modulators operating within a common assembly, or a same signal-generating subsystem operating in two distinct modes, such as a single modulating unit dynamically switching between two distinct modulation schemes. At 104, the time division multiplexed signal is sampled at a digital predistortion adaptation engine. At 106, a timing signal, distinct from the time division multiplexed signal, is provided to the digital predistortion (DPD) adaptation engine. The timing signal indicates, for a given time, from which of the first and the second signal source a corresponding portion of the time divisional multiplexed signal originated. Accordingly, the samples from the time division multiplexed signal can be attributed to the appropriate signal source, allowing for separate predistortion of the signal.

At 108, the digital predistortion adaptation engine determines a first set of filter coefficients from the samples taken at times when the timing signal indicates that the corresponding portion of the time division multiplexed signal originated with the first signal source. For example, the first set of filter coefficients can be determined as to maintain a first modulation error ratio. At 110, the digital predistortion adaptation engine determines a second set of filter coefficients from the samples taken at times when the timing signal indicates that the corresponding portion of the time division multiplexed signal originated with the second signal source. The second set of filter coefficients can be, and generally will be, different than the first set of filter coefficients. In one example, the second set of filter coefficients can be determined as to maintain a second modulation error ratio that is different from the first modulation error ratio.

At 112, digital predistortion is applied to the time division multiplexed signal, such that the first set of filter coefficients is applied to the time division multiplexed signal at times when the timing signal indicates that the corresponding portion of the time division multiplexed signal originated with the first signal source and the second set of filter coefficients is applied to the time division multiplexed signal at times when the timing signal indicates that the corresponding portion of the time division multiplexed signal originated with the second signal source. In one implementation, the first set of filter coefficients are applied to the first signal and the second set of filter coefficients are applied to the second signal before the first signal and the second signal are combined at the multiplexer at 102. In another implementation, predistortion is selectively applied to the time division multiplexed signal after the first signal and the second signal are combined at the multiplexer. It will be appreciated that the selective application of the predistortion can be guided by the timing signal. At 114, the time division multiplexed signal is transmitted at an associated transmitter.

FIG. 4 illustrates another example of a method 150 for broadcasting a signal. At 152, a signal from a first signal source and a second signal source is combined as a time divisional multiplexed signal at a multiplexer. At 154, a timing signal, distinct from the time division multiplexed signal, is provided to the transmitter automatic level control that indicates, for a given time, from which of the first and the second signal source a corresponding portion of the time divisional multiplexed signal originated.

At 156, a first signal parameter for the time division multiplexed signal is maintained while the timing signal indicates that the corresponding portion of the time division multiplexed signal originated with the first source. At 158, a second signal parameter for the time division multiplexed signal is maintained while the timing signal indicates that the corresponding portion of the time division multiplexed signal originated with the second source. In accordance with an aspect of the present invention, the second signal parameter can be different from the first signal parameter. Examples of signal parameters can include values for the average power level of the signal, the peak-to-average ratio of the signal, and the signal-to-noise ratio of the signal. In one implementation, the TDM signal is sampled before transmission at the transmitter automatic level control, with the timing signal used to distinguish between samples originating with the first signal source and the second signal source. In this implementation, the samples can be used as feedback to maintain the first and second signal parameters at 156 and 158. At 160, the time division multiplexed signal is broadcast at an associated antenna.

Figure 5:
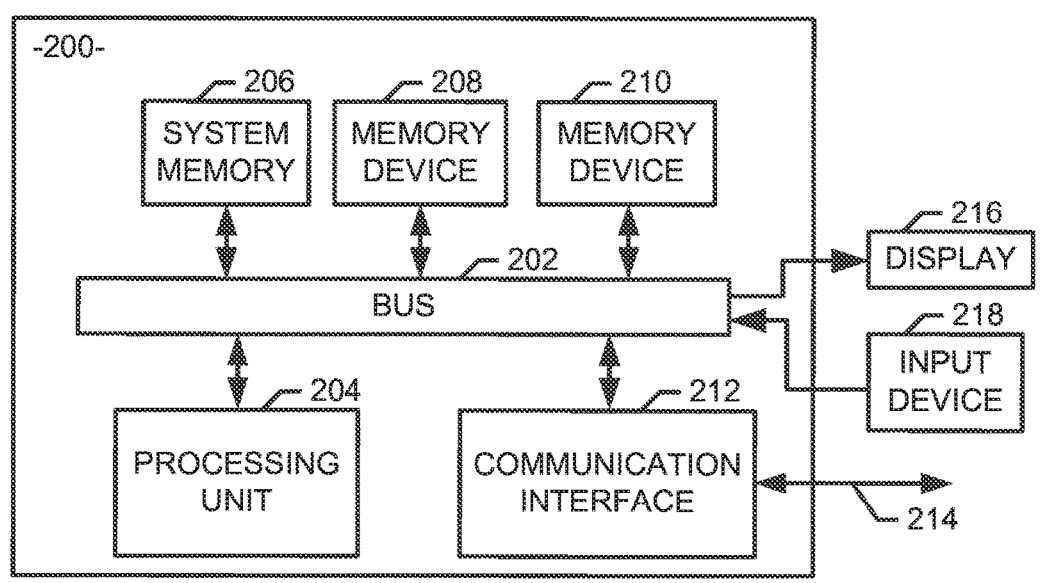
FIG. 5 is a schematic block diagram illustrating an exemplary system of hardware components capable of implementing examples of the systems and methods

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings. Additionally or alternatively, the system 200 can access an external data source or query source through the communication interface 212, which can communicate with the system bus 202 and the communication link 214.

In operation, the system 200 can be used to implement one or more parts of a broadcast system in accordance with the present invention. Computer executable logic for implementing the broadcast system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system comprising:
a multiplexer that combines a first signal from a first signal source and a second signal from a second signal source as a time divisional multiplexed signal and provide a timing signal, distinct from the time division multiplexed signal, that indicates, for a given time, from which of the first and the second signal source a corresponding portion of the time divisional multiplexed signal originated;
a signal conditioning component that receives each of the time divisional multiplexed signal and the timing signal and alters the time division multiplexed signal in a manner that prepares the signal for broadcast, a behavior of the signal conditioning component being dynamically altered according to the timing signal, the signal conditioning component sampling the time division multiplexed signal to provide feedback, with samples taken at times when the timing signal indicates that the corresponding portion of the time division multiplexed signal originated with the first signal source being stored and analyzed separately from samples taken at times when the timing signal indicates that the corresponding portion of the time division multiplexed signal originated with the second signal source; and
an antenna that transmits the time division multiplexed signal.

2. The system of claim 1, wherein the signal conditioning component includes a digital predistortion adaptation engine, the digital predistortion adaptation engine maintaining a first adaptation result, including a first set of filter coefficients, from the samples taken at times when the timing signal indicates that the corresponding portion of the time division multiplexed signal originated with the first signal source and a second adaptation result, including a second set of filter coefficients, from the samples taken at times when the timing signal indicates that the corresponding portion of the time division multiplexed signal originated with the second signal source, the first set of filter coefficients being different than the second set of filter coefficients.

3. The system of claim 2, further comprising a first digital predistortion component that applies predistortion to the first signal using the first set of filter coefficients and applies predistortion to the second signal using the second set of filter coefficients.

4. The system of claim 3, wherein the first set of filter coefficients are calculated to maintain a first modulation error ratio for the first signal and the second set of filter coefficients are calculated to maintain a second modulation error ratio for the second signal.

5. The system of claim 1, wherein the signal conditioning component includes a transmitter automatic level control.

6. The system of claim 5, wherein the transmitter automatic level control controls a power amplifier, such that the power amplifier is muted when the timing signal indicates that the time division multiplexed signal originated with the second source.

7. The system of claim 5, the transmitter automatic level control controlling at least component of a transmitter, such that the transmitter maintains a first peak-to-average ratio (PAR) for the time division multiplexed signal when the timing signal indicates that the corresponding portion of the time division multiplexed signal originated with the first source and the transmitter maintains a second peak-to-average ratio (PAR) for the time division multiplexed signal when the timing signal indicates that the corresponding portion of the time division multiplexed signal originated with the second source.

8. A method comprising:
combining a first signal from a first signal source and a second signal from a second signal source as a time divisional multiplexed signal at a multiplexer;
providing a timing signal, distinct from the time division multiplexed signal, to the transmitter automatic level control that indicates, for a given time, from which of the first and the second signal source a corresponding portion of the time divisional multiplexed signal originated;
maintaining a first signal parameter for the time division multiplexed signal while the timing signal indicates that the corresponding portion of the time division multiplexed signal originated with the first source;
maintaining a second signal parameter for the time division multiplexed signal while the timing signal indicates that the corresponding portion of the time division multiplexed signal originated with the second source, the second signal parameter being different from the first signal parameter; and
broadcasting the time division multiplexed signal at an associated antenna.

9. The method of claim 8, further comprising sampling the time division multiplexed signal at the transmitter automatic level control, the transmitter automatic level control determining from which of the first and the second signal source a corresponding portion of the time divisional multiplexed signal originated from the timing signal;
wherein maintaining the first signal parameter comprises determining the first signal parameter from samples taken at times when the timing signal indicates that the corresponding portion of the time division multiplexed signal originated with the first signal and maintaining the second signal parameter comprises determining the second signal parameter from samples taken at times when the timing signal indicates that the corresponding portion of the time division multiplexed signal originated with the second signal.

10. The method of claim 8, wherein the first signal parameter is a first average power level and the second signal parameter is a second average power level.

11. A method comprising:
combining a first signal from a first signal source and a second signal from a second signal source as a time divisional multiplexed signal at a multiplexer;
sampling the time division multiplexed signal at a digital predistortion adaptation engine;
providing a timing signal, distinct from the time division multiplexed signal, to the digital predistortion adaptation engine that indicates, for a given time, from which of the first and the second signal source a corresponding portion of the time divisional multiplexed signal originated;
determining, at the digital predistortion adaptation engine, a first set of filter coefficients from the samples taken at times when the timing signal indicates that the corresponding portion of the time division multiplexed signal originated with the first signal source;
determining, at the digital predistortion adaptation engine, a second set of filter coefficients from the samples taken at times when the timing signal indicates that the corresponding portion of the time division multiplexed signal originated with the second signal source, the second set of filter coefficients being different than the first set of filter coefficients;
applying digital predistortion to the time division multiplexed signal, such that the first set of filter coefficients is applied to the time division multiplexed signal at times when the timing signal indicates that the corresponding portion of the time division multiplexed signal originated with the first signal source and the second set of filter coefficients is applied to the time division multiplexed signal at times when the timing signal indicates that the corresponding portion of the time division multiplexed signal originated with the second signal source; and
transmitting the time division multiplexed signal at an associated transmitter.

12. The method of claim 11, wherein applying digital predistortion to the time division multiplexed signal comprises applying the first set of filter coefficients to the first signal and applying the second set of filter coefficients to the second signal before the first signal and the second signal are combined at the multiplexer.

13. The method of claim 11, wherein applying digital predistortion to the time division multiplexed signal comprises selectively applying predisortion to the time division multiplexed signal, according to the timing signal, after the first signal and the second signal are combined at the multiplexer.

14. A system comprising:
a multiplexer that combines a first signal from a first signal source and a second signal from a second signal source as a time divisional multiplexed signal and provide a timing signal, distinct from the time division multiplexed signal, that indicates, for a given time, from which of the first and the second signal source a corresponding portion of the time divisional multiplexed signal originated, wherein the first signal source provides a signal in accordance with the Digital Video Broadcasting, Second Generation Terrestrial (DVB-T2) standard, which has a future extension frame, and the second signal source provides a signal as mobile data formatted in accordance with the Long Term Evolution (LTE) standard for broadcast within the future extension frame;
a signal conditioning component that receives each of the time divisional multiplexed signal and the timing signal and alters the time division multiplexed signal in a manner that prepares the signal for broadcast, a behavior of the signal conditioning component being dynamically altered according to the timing signal; and
an antenna that transmits the time division multiplexed signal.

15. A system comprising:
a multiplexer that combines a first signal from a first signal source and a second signal from a second signal source as a time divisional multiplexed signal and provide a timing signal, distinct from the time division multiplexed signal, that indicates, for a given time, from which of the first and the second signal source a corresponding portion of the time divisional multiplexed signal originated;
a signal conditioning component that receives each of the time divisional multiplexed signal and the timing signal and alters the time division multiplexed signal in a manner that prepares the signal for broadcast, a behavior of the signal conditioning component being dynamically altered according to the timing signal, the signal conditioning comprising a transmitter automatic level control controlling at least component of a transmitter, such that the transmitter maintains a first signal parameter for the time division multiplexed signal while the timing signal indicates that the corresponding portion of the time division multiplexed signal originated with the first source and the transmitter maintains a second signal parameter for the time division multiplexed signal while the timing signal indicates that the corresponding portion of the time division multiplexed signal originated with the second source, the second signal parameter being different from the first signal parameter; and an antenna that transmits the time division multiplexed signal.

16. The system of claim 15, wherein the first signal parameter is a first signal-to-noise ratio and the second signal parameter is a second signal-to-noise ratio.

17. The system of claim 15, wherein the first signal parameter is a first average power level and the second signal parameter is a second average power level.

18. The system of claim 15, wherein the first signal parameter is a first peak-to-average ratio and the second signal parameter is a second peak-to-average ratio.

* * * * *